United States Patent
Okumura et al.

(10) Patent No.: US 9,494,935 B2
(45) Date of Patent: Nov. 15, 2016

(54) REMOTE OPERATION OF AUTONOMOUS VEHICLE IN UNEXPECTED ENVIRONMENT

(71) Applicant: Toyota Motor Engineering & Manufacturing North America, Inc., Erlanger, KY (US)

(72) Inventors: Bunyo Okumura, Ann Arbor, MI (US); Danil V. Prokhorov, Canton, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/541,061

(22) Filed: Nov. 13, 2014

(65) Prior Publication Data

US 2016/0139594 A1 May 19, 2016

(51) Int. Cl.
*G05D 1/00* (2006.01)
*B60W 30/00* (2006.01)

(52) U.S. Cl.
CPC ............ *G05D 1/0022* (2013.01); *B60W 30/00* (2013.01); *G05D 2201/0213* (2013.01)

(58) Field of Classification Search
CPC ............ G05D 1/0246; G05D 1/0022; G05D 1/0213; B60W 40/04; B60W 30/00; B62D 15/0285
USPC ................ 701/36, 23, 41, 70; 180/443, 444
See application file for complete search history.

(56) References Cited

U.S. PATENT DOCUMENTS

| | | | |
|---|---|---|---|
| 5,469,356 A | 11/1995 | Hawkins et al. | |
| 7,837,143 B2 | 11/2010 | Matos | |
| 7,894,951 B2 * | 2/2011 | Norris | H04L 67/12 180/443 |
| 8,255,092 B2 | 8/2012 | Phillips et al. | |
| 8,392,065 B2 | 3/2013 | Tolstedt et al. | |
| 8,718,861 B1 | 5/2014 | Montemerlo et al. | |
| 9,002,631 B2 * | 4/2015 | Taguchi | B60W 40/04 340/435 |
| 2008/0033603 A1 * | 2/2008 | Gensler | B62D 15/0285 701/1 |
| 2015/0254986 A1 * | 9/2015 | Fairfield | G08G 1/22 707/687 |

\* cited by examiner

*Primary Examiner* — Adam Tissot
(74) *Attorney, Agent, or Firm* — Christopher G. Darrow; Darrow Mustafa PC

(57) ABSTRACT

Disclosed herein are computer devices, systems, and methods for remotely operating an autonomous passenger vehicle. When an autonomous vehicle encounters an unexpected driving environment unsuitable for autonomous operation, such as road construction or an obstruction, vehicle sensors can capture data about the vehicle and the unexpected driving environment, including images, radar and lidar data, etc. The captured data can be sent to a remote operator. The remote operator can manually operate the vehicle remotely or issue commands to the autonomous vehicle to be executed by on various vehicle systems. The captured data sent to the remote operator can be optimized to conserve bandwidth, such as by sending a limited subset of the captured data.

19 Claims, 2 Drawing Sheets

REMOTE OPERATION OF AUTONOMOUS VEHICLE IN UNEXPECTED ENVIRONMENT

BACKGROUND

This disclosure relates to vehicle control for an autonomous or semi-autonomous vehicle or a vehicle with high degree of driving automation. Some vehicles are configured to operate autonomously, with no input required by the driver. Instead, the vehicle systems are controlled by a computing device associated with the vehicle, using information about the vehicle's movement and the surrounding driving environment provided by various sensors disposed on or otherwise affixed to various points on the vehicle. In related technology, some vehicles are configured to operate semi-autonomously, in which the driver controls only certain aspects of the vehicle operation, such as steering, while the computing device controls other aspects of the vehicle operation, such as braking and acceleration, also using information about the vehicle's movement and the surrounding driving environment received from the sensors.

It has been recognized that some driving environments that the vehicle encounters are too complex or hazardous to rely exclusively on the autonomous systems. In such a case, the vehicle may be able to determine that an unexpected driving environment has been encountered, for which the vehicle is ill equipped to handle, based on the data captured by the vehicle sensors. Various methods have been suggested as to what criteria should be used in making such a determination, for example, U.S. Pat. No. 8,718,861 to Montermerlo et al. Some have suggested that in such a case, the computing device should stop operating the vehicle autonomously and alert the driver that the driver must manually operate the vehicle. However, this could disturb the driver, who would rather not have to control the vehicle.

SUMMARY

Disclosed herein are computer devices, systems, and methods for remotely operating an autonomous vehicle. When an autonomous vehicle encounters an unexpected driving environment unsuitable for autonomous operation, such as road construction or an obstruction, vehicle sensors can capture data about the vehicle and the unexpected driving environment, including images, radar and lidar data, etc. The captured data can be sent to a remote operator. The remote operator can manually operate the vehicle remotely or issue commands to the autonomous vehicle to be executed by on various vehicle systems. The captured data sent to the remote operator can be optimized to conserve bandwidth, such as by sending a limited subset of the captured data.

In one implementation, a computing device for an autonomous passenger vehicle is disclosed, the computing device including: one or more processors for controlling operations of the computing device; a communications interface configured to communicate with a remote server over a network; and a memory for storing data and program instructions used by the one or more processors, wherein the one or more processors are configured to execute instructions stored in the memory to: identify an unexpected driving environment; send information based on the unexpected driving environment received from one or more sensors disposed on the vehicle to a remote operator using the remote server; receive a command sent by the remote operator relating to one or more vehicle systems; and send the command to the one or more vehicle systems for execution.

In another implementation, a computer-implemented method for an autonomous passenger vehicle is disclosed, the method including: identifying an unexpected driving environment; sending information based on the unexpected driving environment received from one or more sensors disposed on the vehicle to a remote operator using a remote server; receiving a command sent by the remote operator relating to one or more vehicle systems; and sending the command to the one or more vehicle systems for execution.

In another implementation, a system is disclosed, which system includes: one or more sensors disposed on a vehicle; and a computing device in communication with the one or more sensors, the computing device comprising: one or more processors for controlling the operations of the computing device; a communications interface configured to communicate with a remote server over a network; and a memory for storing data and program instructions used by the one or more processors, wherein the one or more processors are configured to execute instructions stored in the memory to: identify an unexpected driving environment; send information received from one or more sensors associated with the vehicle to a remote operator using the remote server; receive a command sent by the remote operator relating to one or more vehicle systems; and execute the command on the one or more vehicle systems.

DETAILED DESCRIPTION

Disclosed herein are computer devices, systems, and methods for remotely operating an autonomous vehicle. The autonomous vehicle can be a passenger vehicle which can ordinarily be driven in autonomous mode or operated by a passenger within the vehicle (i.e., the "driver" of the vehicle). When the autonomous vehicle encounters an unexpected driving environment unsuitable for autonomous operation, such as road construction or an obstruction, vehicle sensors can capture data about the vehicle and the unexpected driving environment, including images, radar and lidar data, etc. The captured data can be sent to a remote operator. The remote operator can manually operate the vehicle remotely or issue commands to the autonomous vehicle to be executed by various vehicle systems. The remote operation can be performed without intervention by the driver, or the driver can be required to approve or request the remote operation. The captured data sent to the remote operator can be optimized to conserve bandwidth, such as by sending a limited subset of the captured data, for example, only the minimum information necessary to perform the remote operation, based on the information needs of the remote operator. A search of available communications channels to find the best QoS or fastest communication channel can also be employed. Data about the unexpected driving environment can also be received from other vehicles in the same unexpected driving environment. In addition, the path chosen by the remote operator can also be transmitted to other autonomous vehicles in the same unexpected environment.

Figure 1:
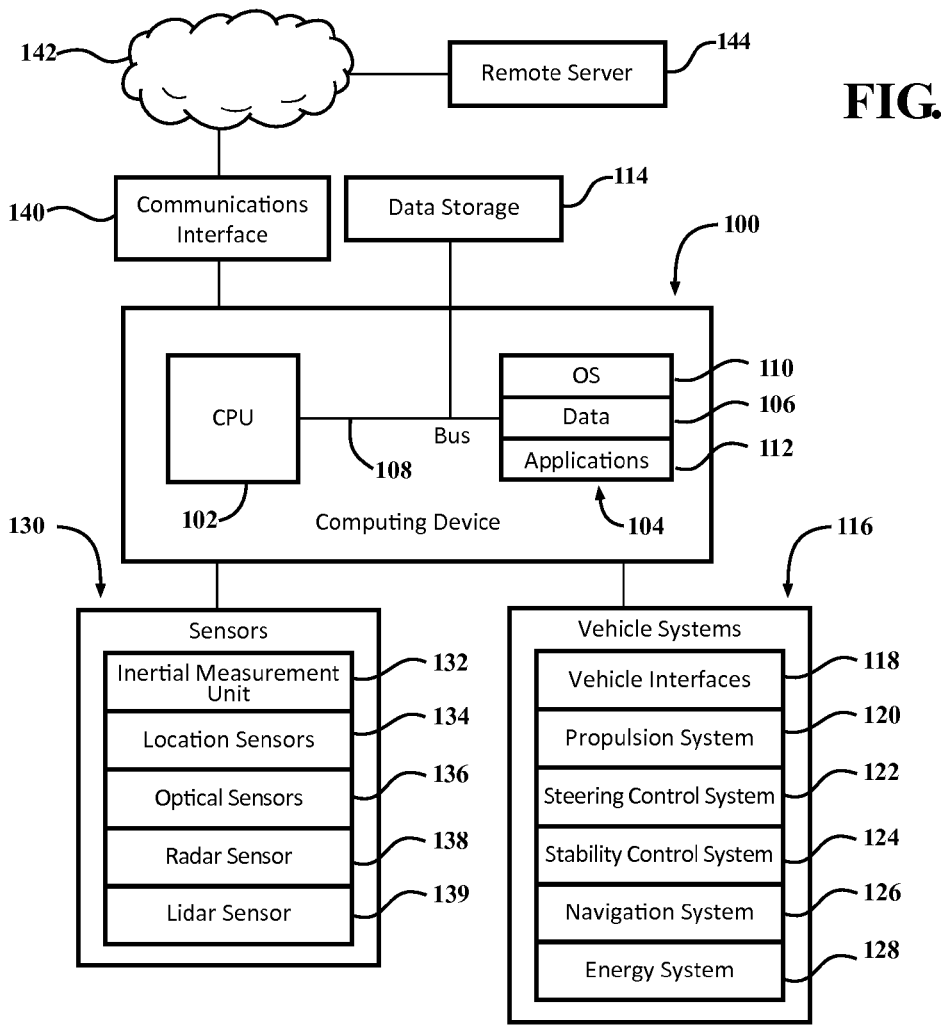
FIG. 1 is a schematic block diagram of a computing device associated with an autonomous vehicle for remotely operating the vehicle.
Figure 2:
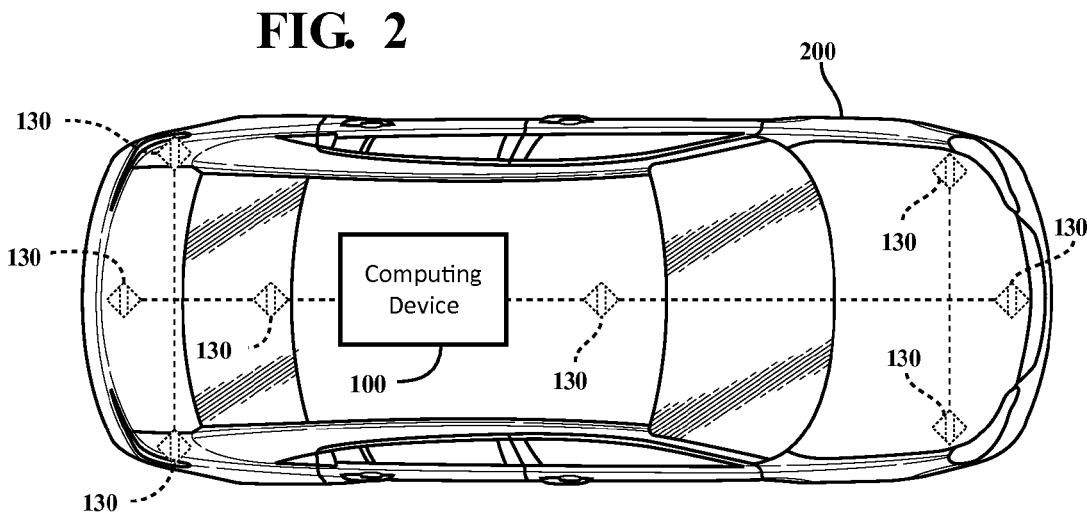
FIG. 2 is a pictorial representation of an autonomous vehicle including the computing device of FIG. 1.

FIG. 1 is a schematic block diagram of a computing device 100 associated with a vehicle 200 (such as depicted in FIG. 2). The computing device 100 can be any type of vehicle-installed, handheld, desktop, or other form of single computing device, or can be composed of multiple computing devices. A processing unit 102 in the computing device 100 can be a conventional central processing unit (CPU) or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement remote operation of the vehicle 200, as described below. The computing device 100 can also include secondary, additional, or external storage 114, for example, a memory card, flash drive, or any other form of computer readable medium. In one implementation, the applications 112 can be stored in whole or in part in the external storage 114 and loaded into the memory 104 as needed for processing.

The computing device 100 can be in direct or indirect communication with one or more vehicle systems 116 to control various vehicle functions. The vehicle systems 116 can include one or more vehicle interfaces 118 that can allow the driver to communicate with the computing device 100 or receive information from the computing device 100. The vehicle interfaces 118 can include, for example, one or more interactive displays, audio systems, voice recognition systems, buttons and/or dials, haptic feedback systems, or any other similar systems used for inputting or outputting information. Other example vehicle systems 116 can include a propulsion system 120; a steering system 122; a stability control system 124; a navigation system 126; an energy system 128; and any other systems that can control various vehicle functions (such as the vehicle climate or entertainment functions, etc.). The vehicle interfaces 118 can be used by the driver to issue commands to the computing device 100 to affect the operation of the other vehicle systems 116.

The propulsion system 120 can control the engine, motor, transmission, and/or other vehicle controls that are used for driving the vehicle 200. The navigation system 126 can be used for establishing the route or directions for the vehicle, and can include maps and/or can connect to external or remote sources for determining an optimal route. The stability control system 124 can activate brakes or motors to one or more of the vehicle's wheels to maintain the stability of the vehicle, including, for example, the proper yaw of the vehicle. The energy system 128 can control the vehicle's energy usage and storage, which energy source may be in the form of gasoline, natural gas, diesel oil, batteries, fuel cells, or the like. The vehicle systems 116 can be in communication with various actuators that can be used to implement the functions controlled by a particular vehicle system 116. For example, the propulsion system 120 can cause an actuator to move the position of a throttle plate based on the position of an accelerator pedal. In this way, the various vehicle systems 116 can control or affect the operation of the vehicle's 200 engine, motor, battery system, accelerators, brakes, steering, transmission, or other systems.

The computing device 100 can also be in direct or indirect communication with one or more sensors 130 that can capture data indicative of performance of the vehicle 200 and vehicle systems 116. The sensors 130 can be used to measure movement of the vehicle 200, such as direction, speed, acceleration, yaw, etc. Based on the data received from the sensors 130, the computing device 100 can control the vehicle systems 116. Example sensors 130 can include accelerometers, gyroscopes, and/or magnetometers, one or more of which can be combined in an inertial measurement unit (IMU) 132. Location sensors 134 can use a global positioning satellite system (GPS) to determine the vehicle's 200 location. Optical sensors 136 such as cameras can capture image data using charge coupled devices (CCD), complementary metal oxide semiconductors (CMOS), or similar image capturing elements, and can be configured to capture single-spectral images or multi-spectral images. Radar sensors 138 and/or lidar sensors 139 (using radio or light detection, respectively) can help identify objects (such as other vehicles) in the vicinity of the vehicle 200. Other example sensors 130 that may be employed can detect changes in the climate (e.g., thermometers or barometers) or altitude (e.g., altimeters), and can include internal sensors to monitor the statuses of the vehicle systems 116 (e.g., monitoring the fuel or energy level, engine temperature, oxygen level, tire pressure, etc.). Among other information detectable by the sensors 130, the sensors 130 can detect vehicle speed, vehicle direction, vehicle acceleration, vehicle rotation, vehicle location, environmental weather conditions, traffic conditions, and road conditions.

The computing device 100 can also include a communications interface 140 through which the computing device 100 can communicate with external sources over a network 142 such as the internet. These external sources can include one or more remote servers 144.

FIG. 2 is a pictorial representation of the vehicle 200 in direct or indirect communication with the computing device 100. The computing device 100 can be located within the vehicle 200 or can be located remotely from the vehicle 200 in an alternate location. If the computing device 100 is remote from the vehicle 200, the vehicle 200 can include the capability of communicating with the computing device 100, such as through the communications interface 140. It should be noted that in this disclosure, the vehicle 200 is generally described an automobile. However, the vehicle 200 is not limited to an automobile, as the disclosed systems and methods could also be implemented with other vehicles generally controlled by a driver, or operator, such as airplanes, boats, trains, etc.

One or more sensors can be disposed on the vehicle 200, such as the sensors 130 described in reference to FIG. 1. For example, one or more sensors 130 included in an IMU 132 can be configured to capture changes in velocity, acceleration, wheel revolution speed, yaw, and distance to objects within the surrounding environment for use by the computing device 100 to estimate position and orientation of the vehicle 200 and steering angle, for example in a dead-reckoning system. One or more sensors 130 can also capture data representative of changes in x, y, and z-axis position, velocity, acceleration, rotation angle, and rotational angular rate for the vehicle and similar data for objects proximate to the navigation route of the vehicle 200. If the sensors 130 capture data for a dead-reckoning system, data relating to wheel revolution speeds, travel distance, steering angle, and steering angular rate of change can be captured.

As another example, lidar sensors 139 can capture data related to laser returns from physical objects in the area surrounding the vehicle 200 with ranging distances calculated by measuring the time it takes for a signal to return to the lidar sensor 139. Laser returns can include the backscattered light reflected by objects hit by a source of light, e.g. laser light, being emitted by the lidar sensors 139 or another source disposed on or proximate to the vehicle 200. Once the light is reflected by an object, the lidar sensors 139 can capture intensity values and reflectivity of each point on the object to be used for analyzing and classifying the object, for example, one of the applications 112 stored within or accessible to the computing device 100.

One or more sensors 130 can also be used to detect traffic signals and traffic patterns, for example by capturing images of traffic lights, markings on the road, or traffic signs. For example, optical sensors 136 can capture images for processing by the computing device 100. As an example, by using the optical sensors 136 to read the lane markings on a road, the computing device 100 can determine where the proper travel lanes are on that road (i.e., the space between two sets of lane markings). As another example, using text recognition processing, one or more optical sensors 136 can read traffic signs that state the legal speed limit on each road. This information can be used by the computing device 100 when operating the vehicle in autonomous mode, as described below. In addition, the optical sensors 136 can be configured to capture single- or multi-spectral image data of the driving environment.

One or more location sensors 134 can capture the position of the vehicle 200 in global coordinates based on signals from a plurality of satellites. A plurality of satellites can be used to estimate the vehicle's 200 position and velocity using three-dimensional triangulation and time estimation. In addition, any other data and/or signals that could be used to determine the current state of the vehicle 200 or determine the position of the vehicle 200 in respect to its environment can be captured by one or more of the sensors 130.

The vehicle 200 can include options for operating in manual mode or autonomous mode. When the vehicle 200 is in manual mode, the driver manually controls the vehicle systems 116. In autonomous mode, on the other hand, the computing device 100 is used to control one or more vehicle systems 116 without the driver's intervention. Some vehicles may be equipped with a "semi-autonomous mode," in which operation of the vehicle 200 is shared between the driver and the computing device 100. For example, the driver can control certain aspects of the vehicle operation, such as steering, while the computing device 100 can control other aspects of the vehicle operation, such as braking and acceleration. In addition to the foregoing two modes, the vehicle 200 can operate in remote operation mode, as described in more detail below.

When the vehicle 200 is operating in autonomous mode, the computing device 100 can analyze the data captured by the sensors 130 and based on the captured data, issue relevant commands to the vehicle systems 116. For example, the computing device 100 can determine the maximum speed limit on a road upon which the vehicle 200 is traveling based on the text of a traffic sign detected by the optical sensors 136. Alternatively, the computing device can use the location information received from the location sensor 134 and map data stored locally (such as in the memory 104 or the external storage 114) or retrieved from a remote source to determine the maximum speed limit. Once the computing device 100 determines the maximum speed limit of the road, the computing device can prevent the vehicle systems 116 from operating the vehicle 200 in excess of the maximum speed limit. As another example, by detecting the lane markings, the computing device 100 can ensure that the vehicle systems 116 operate the vehicle 200 within the appropriate lanes.

It is contemplated that under normal operating circumstances, the sensors 130 will provide enough information for the computing device 100 to operate the vehicle 200 in autonomous mode. However, the vehicle 200 may from time to time encounter unexpected driving environments in which autonomous operation is inappropriate, for example, a construction zone, an obstruction in the middle of the road, heavy traffic, or inclement weather. In addition, certain road patterns may be deemed too challenging for autonomous mode, such as an intersection where there is no clear line of sight, a mountainous region with winding roads, or a dense urban environment. The computing device 100 can detect that the vehicle 200 is in such a driving environment based on data received from the sensors 130, or the locations of such regions can be stored as challenging environments in map data accessible by the computing device 100 (for example, stored locally in the memory 104 or the external storage 114, or accessible from remote sources). Additionally, the existence of an unexpected driving environment can be determined if the environmental information (e.g., the roads, traffic signals, traffic patterns, etc.) as detected by the sensors 130 differs from expected data about the environment, as retrieved from a map or database stored locally or remotely. (A threshold can also be defined to allow minor variance between the captured data and the expected data, and the changes in the environment can be measured against such threshold.) Any of these driving environments for which autonomous mode is ill advised can be deemed an "unexpected driving environments" for the purposes of this disclosure (i.e., regardless whether encountering the driving environment is literally unforeseen). For the purposes of this disclosure, an "unexpected driving environment" means any driving environment or situation which the computing device 100 determines is not suitable for autonomous operation.

If an unexpected driving environment is identified, operation of the vehicle 200 can switch to remote operation mode. In addition, the remote operation mode can be initiated where it is projected that the vehicle 200 may soon encounter an unexpected driving environment, based on the vehicle's 200 current route and real-time map data on current driving environments.

In the remote operation mode, the vehicle 200 can be remotely operated by a remote operator. In one example implementation, the driver (i.e., the occupant physically within the vehicle 200), can be prompted to approve remote operation mode. In another example implementation, remote operation mode can be activated without affirmative action by the driver, and can even be executed invisibly, without the driver being aware that the vehicle 200 is not still in autonomous mode.

In accordance with one example implementation, when the computing device 100 prepares to enter remote operation mode upon identifying an unexpected driving environment, the computing device 100 requests information from the sensors 130 about the vehicle's 200 movement and the unexpected driving environment. This information can include image data (including video data), location data, and radar and/or lidar data. In accordance with another example implementation, the process of collecting additional information from the environment can begin even before the unexpected driving environment is fully identified. For example, once the vehicle 200 experiences some changes in the driving environment as compared to what is expected, even if those changes are not severe and the computing device 100 is still able to respond to the changes autonomously and continue operating in autonomous mode, the data collection process can begin in anticipation of a potential upcoming unexpected driving environment.

In one example implementation, the data collected for remote operation mode can be the same data that is captured by the sensors 130 during autonomous mode. In another example implementation, however, different or additional data can be collected. For example, there may be cameras that are not needed or used for normal autonomous operation but that can capture image data of the surrounding environment that will be useful for the remote operator. Additionally, even if the same or similar data is collected compared with autonomous mode, the data can be organized, packaged, and/or presented in a more human-readable format (as it is to be used by a person rather than the autonomous control system that normally utilizes such data during autonomous mode).

Next, a remote operator can be contacted with a request to take control of the autonomous vehicle 200. The remote operator can be using the remote server 144, which can be contacted by the computing device 100 over the network 142. The data collected by the sensors 130 can be presented to the remote operator, who can view such data while manually operating the vehicle 200. For example, the remote operator can see the surroundings using optical sensors 136 included in or on the vehicle 200, and see data regarding the speed of the surrounding vehicles using the radar sensors 138 or lidar sensors 139. In one example implementation, the sensors 130 can be remotely controlled by the remote operator, for example, to cause the optical sensors 136 to rotate, pan, or zoom in or out. The remote operator can also have access to the location data captured by the location sensor 134. Accordingly, to assist the remote operator, a map of the environment can be displayed to the remote operator, with an icon representing the vehicle 200 displayed at the correct location on the map, along with icons representing other vehicles or other features of or objects in the driving environment.

While the remote operator has control of the vehicle 200, the remote operator can directly operate the vehicle systems 116 in real time, having a real-time awareness of the driving environment using the information captured by the sensors 130, as though operating the vehicle 200 from the driver's seat. In another example implementation, the remote operator can issue commands to an autonomous control system (which can be implemented in an application 112 executed by the computing device 100) to execute various predefined autonomous maneuvers (such as to move over one lane, etc.). The autonomous control system can then perform the selected maneuvers autonomously, with the vehicle 200 remaining in autonomous mode. As another example, the remote operator can manually modify the route that the autonomous control system is using to guide the vehicle. For example, the remote operator can be presented with several options of alternate routes available (as one example user interface for the remote operator, trajectories of alternate routes can be superimposed on a map of the driving environment). Upon the remote operator's selection of a new route, the autonomous control system can then continue to operate the vehicle autonomously using the new route.

In one example implementation, the remote operator can be operating the vehicle 200 from inside a simulator machine with a monitor in place of a windshield that, based on images received from the sensors 130, mimics the view the driver has from inside the vehicle 200 itself.

In another example implementation, information from other vehicles in the vicinity can potentially augment the data captured by the vehicle 200 and assist the remote operator in guiding the vehicle 200. For example, image information captured by cameras disposed on nearby vehicles can provide a different view of the scene that can assist the remote operator. As another example, data received from another vehicle ahead of the vehicle 200 may be able to reveal additional environmental information regarding the unexpected driving environment (such as obstacles not yet encountered by the vehicle 200). In one example implementation, each vehicle on the road (including the vehicle 200) can periodically or continually update a remote server (such as the remote server 144 used by the remote operator) with its location data. Then, when a remote operator is remotely operating a vehicle in that area, the remote server 144 can request sensor data from these vehicles. Alternatively, the computing device 100 in the vehicle 200 itself can communicate with other nearby vehicles using a local, ad hoc wireless connection to receive the relevant sensor data from such other vehicles; the computing device 100 can then forward that information to the remote server 144 to be used by the remote operator.

In one example implementation, before the remote operator is contacted, the driver can be prompted and/or asked, for example, using the interactive display, the audio system, or other vehicle interfaces 118, to confirm or approve granting control to the remote operator. If the driver responds affirmatively and elects to initiate remote operation mode, then the remote operator can be contacted, the relevant data captured by the sensors 130 can be sent to the remote operator, and control of the vehicle 200 can pass to the remote operator. If, on the other hand, the driver does not elect to contact the remote operator, then the vehicle 200 can switch to manual mode and the driver can take control of the vehicle 200 and vehicle systems 116. Alternatively, the vehicle 200 can be configured so that the driver is given the opportunity to affirmatively elect to retain control of the vehicle 200 and enter it into manual mode, and if the driver does not so elect within a predefined number of seconds, then the remote operator is contacted and control of the vehicle 200 passes automatically to the remote operator.

In another example implementation, when the vehicle 200 encounters an unexpected driving environment, control can pass to the remote operator seamlessly and automatically, without requiring an affirmative selection by the driver. In such an implementation, the driver can be alerted to the fact that the vehicle 200 is being operated remotely by a remote operator. In addition, an audio or text-based communication can be established between the remote operator and the driver so that the remote operator is able to ask the driver questions regarding the current driving environment or otherwise advise the driver regarding the remote operation of the vehicle 200. Furthermore, in a particularly challenging unexpected driving environment, it is possible that the remote operator may not feel comfortable operating the vehicle 200 remotely. In such a case, the remote operator can advise the driver that control is being ceded to the driver and that the vehicle 200 will be entering manual mode. In another example implementation, control can pass to the remote operator automatically, without requiring an affirmative selection by the driver, and without notifying the driver. In this way, the fact that the vehicle 200 is being remotely operated instead of autonomously operated can be invisible to the driver.

Because the remote operation of the vehicle 200 can be occurring in real time, data transmission reliability can be an important issue. Accordingly, the data transmitted to the remote operator can be prepared and transmitted in an optimized fashion by transmitting only the minimum amount of information needed by the remote operator to operate the vehicle 200. For example, the data can be compressed to save bandwidth. Moreover, in one example implementation, only the most relevant sensor data can be transmitted to the remote operator. For example, if the computing device 100 determines that the unexpected driving environment is based on an unexpected element coming from the driver's side of the vehicle 200 (for example, an obstructed view of the road onto which the driver wishes to turn left), then the computing device 100 can be configured to send to the remote operator only image data from the front and driver's side optical sensors 136 (and not, for example, from any rear cameras). As another example, only the most relevant parts of the point cloud of the lidar data captured by the lidar sensors 139 can be sent to the remote server 144. As described above, other vehicles on the road may also be communicating with and sending data (including sensor and/or image data) to the remote server 144. Accordingly, in some instances, the most bandwidth-efficient method may be to use information captured by sensors located on other, nearby vehicles, which may already be stored or cached by the remote server 144. In short, all information transferred can be according to the needs of the unexpected driving environment. If additional data is needed in the course of remote operation, such additional data can be obtained from the sensors 130 or from off-vehicle sources and transmitted to the remote operator as required.

In another example implementation, the vehicle 200 can be equipped with a cognitive radio that can measure quality metrics of available networks (such as bandwidth, network speed, reliability, etc.) so that the computing device 100 can search and lock onto the optimal communication networks in terms of quality-of-service (QoS) and bandwidth capabilities. The computing device 100 can also utilize the driver's mobile phone to engage in its search for the optimal communication networks.

In another example implementation, the bandwidth available can be measured against the bandwidth required for transferring the relevant data (for example, data captured by the sensors 130). If the bandwidth is sufficient for the information needing to be transferred, then such information is transferred and no change is made to the vehicle's 200 operation. However, if the bandwidth is insufficient, then the information can be transferred more slowly (for example, video stream data from the optical sensors 136 can begin to be transferred at a lower frame rate). In such case, the computing device 100 can be configured to automatically transfer control of the vehicle from the remote operator to the driver (i.e., enter manual mode), limit the vehicle's 200 speed, or cause the vehicle 200 to autonomously pull over to the side of the road.

As described above, the remote server 144 can be in direct or indirect communication with other vehicles in the vicinity (e.g., either over the network 142 or through an ad hoc network formed locally between the vehicle 200 and other nearby vehicles, as described above). In one example implementation, the paths chosen by the remote operator can be transmitted to other autonomous vehicles in the same unexpected driving environment to provide guidance to their respective autonomous operation systems. Also, if there is insufficient bandwidth to transfer the requisite information, communications systems of other vehicles in the vicinity (or mobile phones of other drivers in the vicinity) can be harnessed in a peer-to-peer network arrangement for communicating such information. Thus, the effective bandwidth available to the computing device 100 for remote operation mode is increased.

It is contemplated that the disclosed devices, methods, and systems can be applied to vehicles which are exclusively autonomous vis-à-vis the occupant, meaning that there are no manual controls (such as a steering wheel, gear shift, pedals, etc.) with which the occupant can operate the vehicle 200. While a completely autonomous vehicle 200 has no need for the inclusion of these manual controls, which would add weight, space, and expense to the vehicle 200, there may be unexpected driving environments that would warrant an experienced human taking control of the vehicle 200. Thus, in the case of a vehicle 200 in which the occupant has no operating capability, control of the vehicle 200 can pass to the remote operator, as described in this disclosure, automatically in the event that the vehicle encounters an unexpected driving environment. Accordingly, in this implementation, the vehicle 200 can be controlled only autonomously by the computing device 100 or manually by a remote operator. In such an implementation, it may not be necessary to notify the driver (i.e., the vehicle 200 occupant) who is controlling the operation of the vehicle 200, and so in the case of an unexpected driving environment, control can pass to the remote operator automatically, without requiring an affirmative selection by the driver, and without notifying the driver. In a similar vein, the computing device 100 can be configured to detect if the driver is sleeping, for example, using cameras that can capture the driver's eye movements or a heart rate monitor. If the driver is determined to be sleeping, then control of the vehicle 200 can pass to the remote operator automatically and immediately, without the driver needing to confirm granting control to the remote operator.

Figure 3:
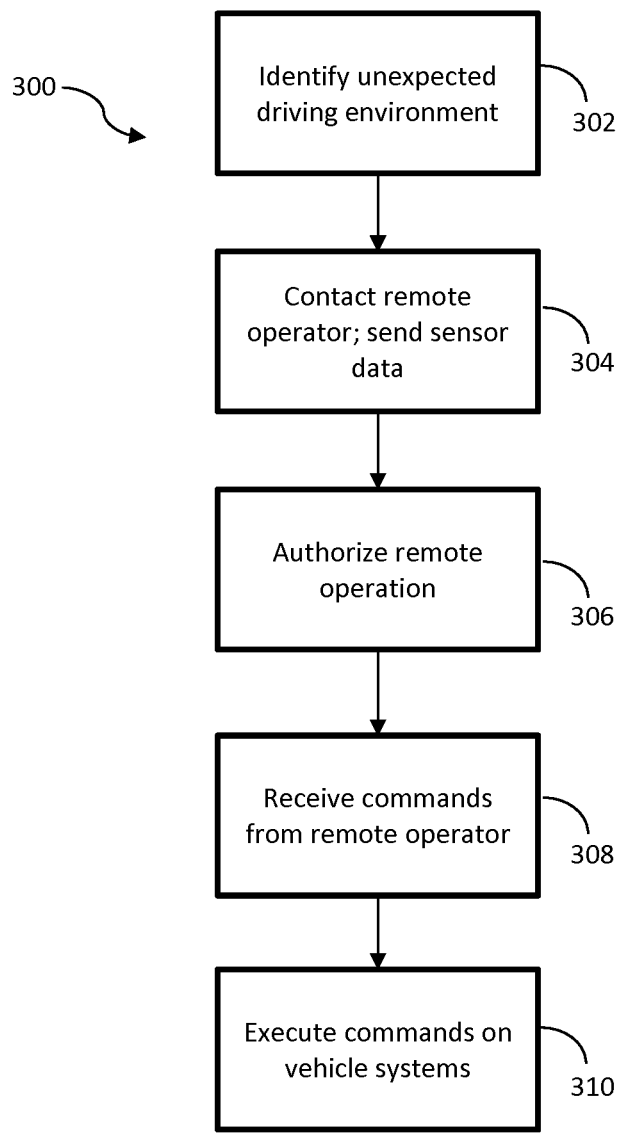
FIG. 3 is a logic flowchart of an example process for remotely operating an autonomous vehicle.

FIG. 3 is a logic flowchart of an example process 300 for remotely operating an autonomous vehicle. At step 302, the computing device 100, based on data captured by the sensors 130, identifies an unexpected driving environment. At step 304, the computing device 100 contacts the remote operator, which includes sending sensor data to the remote operator. As described above, the computing device 100 can selectively send limited data in order to conserve bandwidth. At step 306, remote operation is authorized. As described above, authorization can be automatic or can require the affirmative consent of the remote operator, the driver, or both. At step 308, the computing device 100 receives commands sent by the remote operator. At step 310, the computing device 100 sends these commands to the vehicle systems 116 for execution. As described above, these commands can include directly controlling all aspects of the vehicle's 200 operation (akin to the control the driver exercises when manually operating the vehicle 200 from within the vehicle 200), or these commands may be high-level instructions to the computing device 100 (such as selecting a particular route or maneuver for the vehicle 200 to take), which can then be implemented via the vehicle's 200 standard autonomous operation mode.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, the user in the instant disclosure is generally identified as the driver of the vehicle 200. However, the user may be any occupant or authorized user of the vehicle 200 without departing from the spirit and scope of the appended claims. In addition, where the "autonomous vehicle" is used in this disclosure, the vehicle need not be autonomous in every respect; rather, such term can encompass any vehicle that utilizes highly automated or semi-autonomous operations, without departing from the spirit and scope of the appended claims. The scope of the claims is thus to be accorded the broadest interpretation so as to encompass all such modifications and equivalent structures as is permitted under the law.

What is claimed is:

1. A computing device for an autonomous passenger vehicle comprising:
   one or more processors for controlling operations of the computing device;
   a communications interface configured to communicate with a remote server over a network; and
   a memory for storing data and program instructions used by the one or more processors, wherein the one or more processors are configured to execute instructions stored in the memory to:
   identify an unexpected driving environment
   send information based on the unexpected driving environment received from one or more sensors disposed on the vehicle to a remote operator using the remote server;
   receive a command sent by the remote operator relating to one or more vehicle systems; and
   send the command to the one or more vehicle systems for execution, the command being sent based on a quality metric of the network.

2. The computing device of claim 1, wherein the unexpected driving environment is identified autonomously based at least in part on information received from the one or more sensors disposed on the vehicle.

3. The computing device of claim 1, wherein the information received from the one or more sensors relates to at least one of: vehicle speed, vehicle direction, vehicle acceleration, vehicle rotation, vehicle location, environmental weather conditions, traffic conditions, road conditions, and images of the unexpected driving environment.

4. The computing device of claim 1, wherein the vehicle systems include at least one of a steering system, a propulsion system, a stability control system, a navigation system, and an energy system.

5. The computing device of claim 1, wherein the command received from the remote operator is used to directly control the one or more vehicle systems.

6. The computing device of claim 1, wherein the vehicle systems are controlled autonomously based on the command received from the remote operator.

7. The computing device of claim 1, wherein the information received from the one or more sensors is sent to the remote operator upon receiving an indication of approval by an occupant of the vehicle.

8. The computing device of claim 1, wherein the information received from the one or more sensors is sent to the remote operator upon identification of the unexpected driving environment.

9. The computing device of claim 1, wherein the information received from the one or more sensors is selectively sent to the remote operator based on the remote operator's need for the information in remotely operating the vehicle.

10. The computing device of claim 1, wherein additional information relating to the unexpected driving environment is received from other vehicles located at the unexpected driving environment.

11. The computing device of claim 1, wherein the command is sent to other vehicles located at the unexpected driving environment for autonomously controlling the other vehicles.

12. The computing device of claim 1, wherein the network is selected based on quality of service.

13. The computing device of claim 1, wherein the information sent over the network is based at least in part on a quality metric of the network.

14. A computer-implemented method for an autonomous passenger vehicle comprising:
   identifying, using one or more processors, an unexpected driving environment if at least
   sending information based on the unexpected driving environment received from one or more sensors disposed on the vehicle to a remote operator using a remote server;
   receiving a command sent by the remote operator relating to one or more vehicle systems; and
   sending the command to the one or more vehicle systems for execution, the command being sent based on a quality metric of the network.

15. The method of claim 14, wherein the unexpected driving environment is identified autonomously based at least in part on information received from the one or more sensors disposed on the vehicle.

16. The method of claim 14, wherein the command received from the remote operator is used to directly control the one or more vehicle systems.

17. The method of claim 14, wherein the vehicle systems are controlled autonomously based on the command received from the remote operator.

18. The method of claim 14, wherein the information received from the one or more sensors is selectively sent to the remote operator based on the remote operator's need for the information in remotely operating the vehicle.

19. A system comprising:
   one or more sensors disposed on a vehicle; and
   a computing device in communication with the one or more sensors, comprising:
   one or more processors for controlling operations of the computing device;
   a communications interface configured to communicate with a remote server over a network; and
   a memory for storing data and program instructions used by the one or more processors, wherein the one or more processors are configured to execute instructions stored in the memory to:
   identify an unexpected driving environment
   send information received from one or more sensors associated with the vehicle to a remote operator using the remote server;
   receive a command sent by the remote operator relating to one or more vehicle systems;
   send the command to the one or more vehicle systems based on a quality metric of the network; and
   execute the command on the one or more vehicle systems.

* * * * *